United States Patent [19]

Klepac

[11] Patent Number: 5,794,563
[45] Date of Patent: Aug. 18, 1998

[54] STAND-MOUNTED GAME FEEDER APPARATUS

[76] Inventor: Daniel T. Klepac, 5411 Rancho Rd., Needville, Tex. 77461

[21] Appl. No.: 747,556

[22] Filed: Nov. 12, 1996

[51] Int. Cl.⁶ .................................................. A01K 5/02
[52] U.S. Cl. ..................... 119/57.91; 119/51.11; 119/61
[58] Field of Search ..................... 119/57.91, 57.92, 119/51.01, 51.11, 61, 51.12

[56] References Cited

U.S. PATENT DOCUMENTS

| | | | |
|---|---|---|---|
| 1,145,049 | 7/1915 | Williams | 119/61 |
| 1,558,316 | 10/1925 | Tipple | 119/51.01 |
| 3,017,858 | 1/1962 | Brown | 119/61 |
| 3,144,173 | 8/1964 | France et al. | 119/51.11 |
| 3,187,722 | 6/1965 | Gilmore et al. | 119/61 |
| 3,195,508 | 7/1965 | Lehman et al. | 119/57.91 |
| 4,027,627 | 6/1977 | Fillion | 119/51.11 |
| 4,291,648 | 9/1981 | Garvin | 119/61 |
| 4,361,116 | 11/1982 | Kilham | 119/51.01 |
| 4,986,220 | 1/1991 | Reneau et al. | 119/57.91 |
| 5,054,431 | 10/1991 | Coviello | 119/51.01 |
| 5,421,290 | 6/1995 | Welch | 119/57.91 |
| 5,584,263 | 12/1996 | Sexton | 119/61 |

OTHER PUBLICATIONS

Moultrie Feeders, Moultrie Feeders—A Pattern of Success catalog, Jan. 1, 1995.

*Primary Examiner*—Paul J. Hirsch
*Attorney, Agent, or Firm*—Pravel, Hewitt, Kimball & Krieger

[57] ABSTRACT

A stand-mounted game feeder apparatus for dispensing feed. The game feeder apparatus including a container or drum for storing feed. The container has a bottom panel with a center opening through the bottom panel. A support assembly for supporting the container includes a vertical tube which extends through the center opening. A plurality of legs are connected to a lower portion of the vertical tube. A winch having a rotatable spool is attached to the support assembly. A cable has a first end attached to the rotatable spool and a second end attached to the container. A first pulley is rotatably connected to the lower portion of the tube and a second pulley is rotatably connected to the upper portion of the tube. The cable is guided by the first and second pulleys to the container and the container is raised and lowered along the post via the winch and cable.

15 Claims, 2 Drawing Sheets

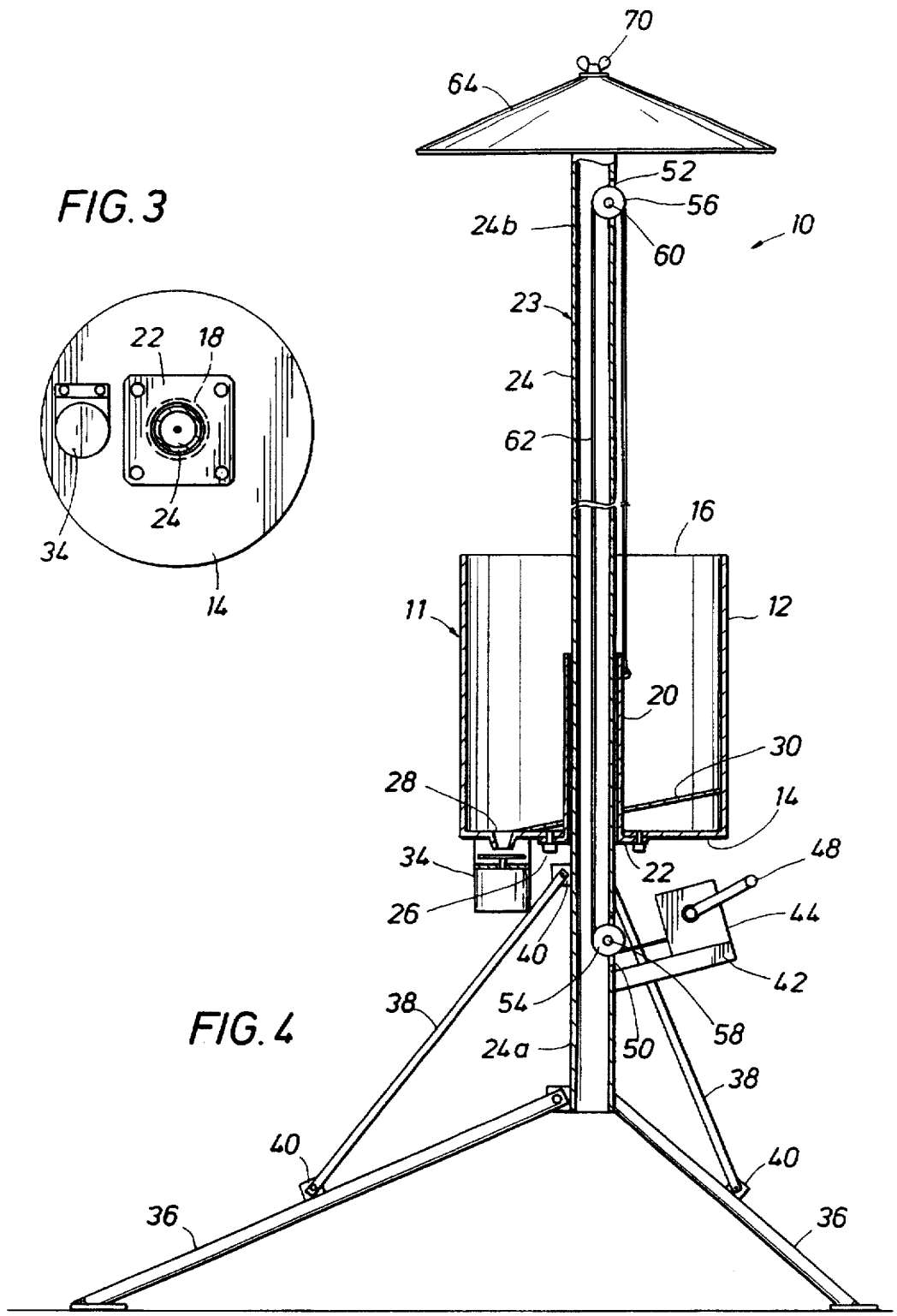

5,794,563

1
STAND-MOUNTED GAME FEEDER APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to game feeders, and more particularly to stand-mounted game feeders.

2. Description of the Related Art

The sport of game hunting is of increasing popularity. It is common practice for hunters or game managers to provide feeders on the hunting property to attract and hold higher concentrations of game in the particular area. Typically, a game feeder with feed is strategically located to develop routines for eating which become a habit for the animals.

There are several types of game feeders available in the marketplace. The game feeders are available in various sizes to hold various amounts of feed. Some game feeders include programmable timers that can dispense adjustable amounts of feed at different times of the day. Some game feeders are suspended from tree limbs while others include stands, typically of a tripod configuration, for support. Commonly, the larger game feeders utilize a 30 or 55 gallon drum or barrel which can hold approximately 200 or 400 pounds of feed, respectively.

Typically, the larger game feeders utilizing a feed container comprising a 30 or 55 gallon drum are supported approximately six to eight feet above the ground from a tripod stand. One company, Moultrie Feeders of Alabaster, Ala., sells a feeder kit including hardware and mounting attachments for mounting three legs directly to a 55 gallon drum to make a stand-mounted game feeder. These stand-mounted game feeders require a ladder be placed against or adjacent the game feeder for filling the feed container with feed. The hunter or game manager is required to climb the ladder to fill the feed container from a top opening located approximately nine to eleven feet above the ground. As previously stated, approximately 200 or 400 pounds of feed can be placed within the 30 or 55 gallon drum, respectively, of the game feeder. Certain stand-mounted game feeders of this type include a ladder as part of the game feeder to make filling of the game feeder quicker, easier and safer than bringing one's own ladder to the game feeder. Regardless of whether the ladder is included with the stand-mounted game feeder or must be separately positioned next to the game feeder, the game manager is required to climb a ladder while carrying a heavy amount of feed to put into the feed container. This exposes the game manager to risks of injury resulting from falling off the ladder, tipping of the ladder and/or game feeder, or straining oneself while filling the feed container.

It is desirable to have a stand-mounted game feeder having a capacity of 30 to 55 gallon drum size which is safe and eliminates the risk of injury resulting from climbing a ladder to fill the feed container. It is further desirable that the stand-mounted game feeder be easy to use and easy and safe to fill with feed. It is also desirable that the stand-mounted game feeder be dependable and inexpensive.

BRIEF SUMMARY OF THE INVENTION

The present invention is a stand-mounted game feeder apparatus for dispensing feed which eliminates the risk of injury resulting from climbing a ladder to fill a feed container of the game feeder apparatus. The stand-mounted game feeder apparatus of the present invention incorporates a winch assembly to raise and lower the feed container. The feed container is lowered by the winch assembly to a filling position where a game manager can fill the drum while standing on the ground without the assistance of a ladder. The filled feed container is then raised to a feeding position with the winch assembly.

The stand-mounted game feeder apparatus includes a feed container comprising a drum for storing feed. The drum has a bottom panel with a center opening through the bottom panel. A support assembly for supporting the feed container includes a vertical post which extends through the center opening. A plurality of legs are connected to a lower portion of the vertical post. A winch having a rotatable spool is attached to the support assembly. A cable has a first end attached to the rotatable spool and a second end attached to the feed container. A lower pulley is rotatably connected to the lower portion of the vertical post and an upper pulley is rotatably connected to the upper portion of the post. The cable is guided by the lower and upper pulleys to the feed container. The feed container is raised and lowered along the vertical post via the winch and cable.

BRIEF DESCRIPTION OF THE VIEWS OF THE DRAWINGS

In order to more fully understand the drawings referred to in the detailed description of the present invention, a brief description of each drawing is presented, in which:

FIG. 3 is a view taken along lines 3—3 of FIG. 1; and

FIG. 4 is a cross-sectional elevational view of the stand-mounted game feeder apparatus showing the feed container in a filling position.

DETAILED DESCRIPTION OF THE INVENTION

Figure 1:
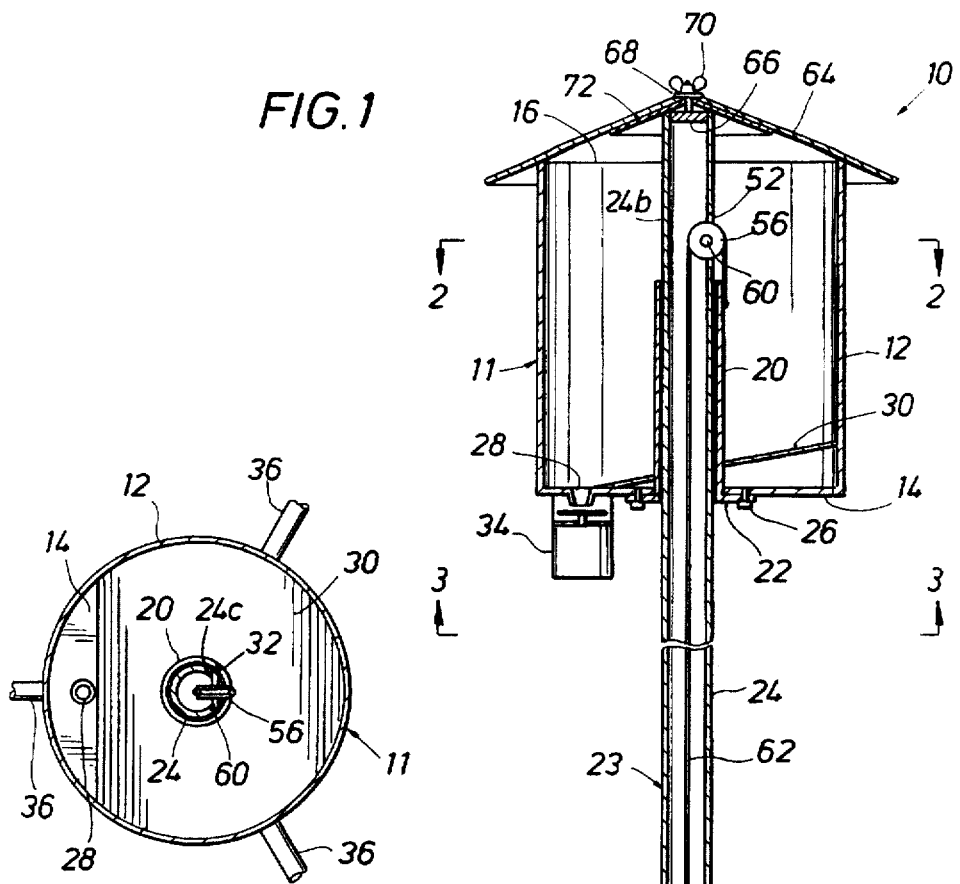
FIG. 1 is a cross-sectional elevational view of the stand-mounted game feeder apparatus according to the present invention, the game feeder apparatus shown with a feed container in a feeding position.

Referring to the drawings in greater detail, the stand-mounted game feeder apparatus of the present invention, generally referred to as 10, is shown in elevation in FIGS. 1 and 4. Referring to FIG. 1, the stand-mounted game feeder apparatus 10 is shown with a feed container 11 in a feeding position and in FIG. 4 the feed container 11 is in a filling position.

Referring to FIGS. 1–4, the feed container 11 includes a barrel or drum 12. The drum 12 is preferably a cylindrical barrel having a round bottom panel 14. In the preferred embodiment, the cylindrical drum 12 is a 30 gallon drum. It is to be understood that other sizes of drums, preferably up to 55 gallon capacity, may be used. The drum 12 has an upper open end 16. A center opening 18 is formed in the bottom panel 14 (FIG. 3).

An inner sleeve 20 having an end flange 22 is mounted to the bottom panel 14 of the drum 12. The inner sleeve 20 is a hollow tube which is sized to slidably extend over a vertical post 24 of a support assembly 23. Preferably, the inner diameter of the inner sleeve 20 is approximately ¼ inch greater than the outer diameter of the vertical post 24. More preferably, the inner diameter of the inner sleeve 20 is approximately ⅛ inch greater than the outer diameter of the vertical post 24. Preferably, the inner sleeve 20 fits within the center opening 18 of the bottom panel 14. As shown in FIGS. 1, 3 and 4, a plurality of fasteners 26 are used to secure the end flange 22 to the bottom panel 14. Preferably, the fasteners 26 are bolts and nuts.

The bottom panel 14 includes a feed hole 28 through which the feed exits the feed container 11. A sloped panel 30 is mounted within the drum 12 in such a manner that the panel 30 slopes toward the feed opening 28 to direct feed to the feed opening 28. The sloped panel 30 includes a sleeve opening 32 (FIG. 2) shaped to form a close fit around the inner sleeve 20. In the preferred embodiment, the sloped panel 30 is secured in place by tack welding or other suitable means of fastening. Although not shown, it is to be understood that the sloped panel 30 could alternatively be a funnel-shaped member directing the feed to the feed opening 28.

A dispenser/spreader assembly 34 is mounted to the bottom panel 14 below the feeder opening 28. The dispenser/spreader assembly 34 dispenses the feed from the feed container 11 and spreads the feed on the ground in the area below the game feeder apparatus 10. It is to be understood that the dispenser/spreader assembly 34 is well known to those of ordinary skill in the art. One such dispenser/spreader assembly 34 is available from Moultrie Feeders, Alabaster, Ala. 35007. It is also to be understood that the dispenser/spreader assembly 34 may also include a timer and control unit which can be programmed to enable the game feeder apparatus 10 to dispense feed at various times during the day and in selected amounts. This type of dispenser/spreader assembly 34 is also available from Moultrie Feeders.

Figure 2:
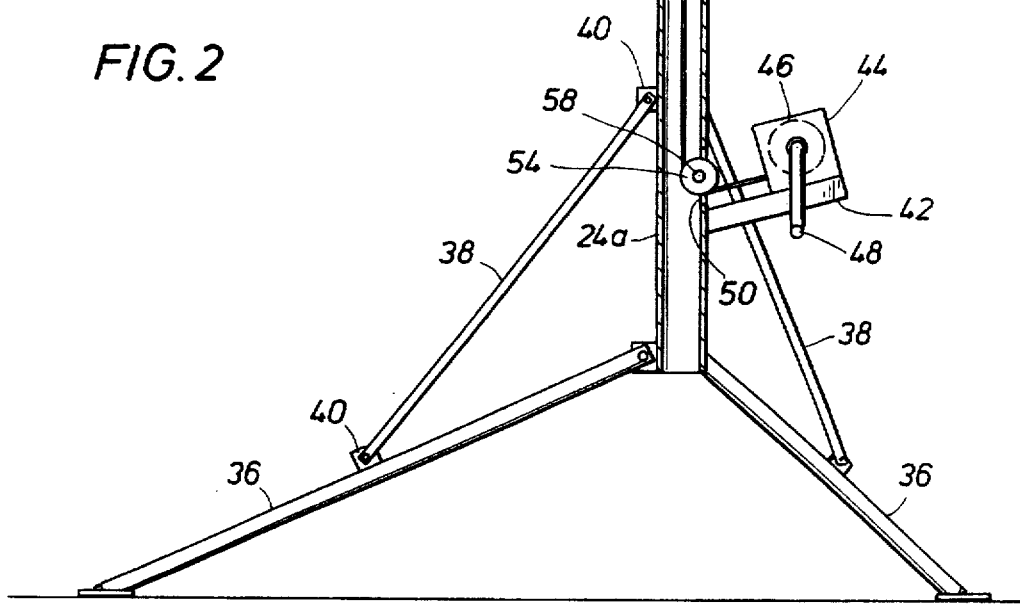
FIG. 2 is a view taken along lines 2—2 of FIG. 1.

The support assembly 23 will now be described in greater detail. The vertical post 24 is preferably hollow structural tubing having a lower portion 24a and an upper portion 24b. Although not shown, it is to be understood that the vertical post 24 could be formed from two or more mating sections of tubing if desired. The plurality of mating sections of the vertical post 24 will facilitate the handling and transport of the game feeder apparatus 10 in the field. In the preferred embodiment, a plurality of legs 36 are pivotably connected or pin connected to the lower portion 24a of the vertical post 24. Preferably, three legs 36 are spaced 120° from one another around the vertical post 24 as shown in FIG. 2. Each leg 36 includes a pin connected brace 38 spanning between the vertical post 24 and the leg 36. Each leg 36 includes a small plate 40 connected to the leg 36 at approximately its mid portion. The brace 38 is pin connected to the plate 40 attached to the leg 36. Similarly, the other end of the brace 38 is attached to the vertical post 24 with a similar pin connection to a plate 40.

A stanchion 42, extending outwardly from the vertical post 24, is securely mounted to the vertical post 24. A winch assembly 44 having a rotatable spool 46 is securely mounted to the stanchion 42. A winch handle 48 is provided to rotate the spool 46 of the winch assembly 44. Although not shown, it is to be understood that the winch assembly 44 includes a locking type mechanism to prevent "free-wheeling" rotation of the spool 46 for reasons which will be explained below.

The vertical post 24 includes a pair of vertical slots 50 and 52. Referring to FIGS. 1 and 4, the first vertical slot 50 is made in the lower portion 24a of the vertical post 24 at a location slightly above the mounting of the stanchion 42 to the vertical post 24. The second vertical slot 52 is formed in the upper portion 24b of the vertical post 24. Lower and upper pulleys 54 and 56, respectively, are mounted within the vertical slots 50 and 52, respectively. Referring to FIG. 2, the upper pulley 56 is mounted within the second vertical slot 52 with a transverse pin 60 extending through the upper pulley 56 and into a pair of aligned bores 24c in the vertical post 24 at an elevation coinciding with the second vertical slot 52. The lower pulley 54 is mounted within the first vertical slot 50 in a similar manner with a pin 58. As shown in FIGS. 1 and 4, the upper and lower pulleys 56 and 54, respectively, are mounted such that a portion of each pulley is inside the vertical post 24 and a portion extends outside the vertical post 24.

A cable 62 has a first end attached to the spool 46 of the winch assembly 44. The cable 62 is inserted through the first vertical slot 50 into the interior of the vertical post 24 and exits the vertical post 24 through the second vertical slot 52. The cable 62 extends partially around the lower pulley 54 and up through the interior of the center post 24 before passing over the upper pulley 56. The second end of the cable 62 is attached to the upper portion of the inner sleeve 20 of the feed container 11. Thus, it is to be understood that as the winch assembly 44 unwinds the cable 62 from the spool 46, the feed container 11 is lowered to the filling position as shown in FIG. 4. Likewise, as the cable 62 is reeled onto the spool 46, the feed container 11 is raised to its feeding position as shown in FIG. 1. It is important from both a safety and operational standpoint that the winch assembly 44 prevents any "free-wheeling" of the spool 46 to eliminate any sudden or uncontrolled free fall of the feed container 11 from the upper feeding position to the lower filling position.

Referring to FIGS. 1 and 4, the stand-mounted game feeder apparatus 10 includes a top cover 64 which mounts to the top end of the vertical post 24. The top cover 64 is conical shaped in the preferred embodiment. Preferably, the vertical post 24 includes a cap plate 66 secured to the vertical post 24. An upwardly extending stud 68 is centrally located on the cap plate 66. The top cover 64 includes a center hole to receive the stud 68. A wing nut 70 is threaded onto the stud 68 to secure the top cover 64 to the vertical post 24. Preferably, the top cover 64 includes an interior stiffener cone 72 to provide additional rigidity and stability to the top cover 64. Preferably, the top cover 64 has an outer diameter greater than the outer diameter of the feed container 11 to protect against rain and water from entering the feed container 11. Additionally, in the feeding position as shown in FIG. 1, the feed container 11 is raised until the upper portion of the drum 12 contacts the top cover 64. The top cover 64 prevents animals, such as birds and squirrels, from getting into the feed container 11 and devouring the feed.

In the preferred embodiment of the present invention, the vertical post 24 is a one and a half inch diameter schedule 40 pipe having a length of approximately nine feet. The legs 36 are preferably made from one inch diameter schedule 40 pipe and have a length of approximately four feet. The braces 38 are preferably made of one-half inch diameter schedule 40 pipe having a length of approximately three feet. Preferably, the inner sleeve 20 is made from two inch diameter schedule 40 pipe having a length of approximately twelve inches.

Typically, a 30 gallon drum has a height of approximately 28 inches and a diameter of approximately 20 inches. In this instance, the top cover 64 preferably has an outer diameter of approximately 24 inches and is fabricated from 24 gauge galvanized plate.

Preferably, the winch assembly 44 is the same type as used on boat trailers and various other applications. One such suitable winch assembly is available from Fulton Performance Products, Inc. of Mosinee, Wis. In the preferred embodiment, the cable 62 is a wire rope having a diameter of approximately 3/16ths inch or less, depending on the load requirement and safety factor.

It is to be understood that to disassemble the stand-mounted game feeder apparatus 10, the pin connections at the leg 36 can be disconnected and the braces 38 and the legs 36 pivoted to a vertical position. When disassembled in this manner, the feed container 11, which has been emptied, is typically in the feeding position as shown in FIG. 1.

The stand-mounted game feeder apparatus 10 allows the game manager or operator to lower the feed container 11 using the winch assembly 44 and to fill the feed container 11 while standing on the ground. This eliminates all risks associated with the prior art stand-mounted game feeders requiring the operator to stand on a ladder while filling the feed container. The stand-mounted game feeder apparatus 10 of the present invention is inexpensive to fabricate, easy to assemble and safe and easy to operate.

Having described the invention above, various modifications of the techniques, procedures, material and equipment will be apparent to those in the art. It is intended that all such variations within the scope and spirit of the appended claims be embraced thereby.

What is claimed is:

1. A game feeder apparatus for dispensing feed comprising:

a container for storing feed, said container having a bottom panel having a center opening therethrough;

a vertical tube extending through said center opening, said vertical tube having an upper portion and a lower portion;

a plurality of legs connected to said lower portion of said vertical tube;

a winch having a rotatable spool, said winch mounted to said vertical tube;

a cable having a first end attached to said rotatable spool, said cable having a second end attached to said container;

a first pulley rotatably connected to said lower portion of said tube; and a second pulley rotatably connected to said upper portion of said tube;

wherein said cable is guided by said first and second pulleys to said container.

2. The apparatus of claim 1, wherein said cable extends from said first pulley to said second pulley within said vertical tube.

3. The apparatus of claim 1, wherein said container includes an inner sleeve attached to said bottom panel aligned with said center opening and said cable is attached to said inner sleeve.

4. The apparatus of claim 1, wherein said first and second pulleys are mounted partially within said vertical tube and said cable extends from said first pulley to said second pulley within said vertical tube.

5. The apparatus of claim 1, further comprising a top cover mounted to said upper portion of said vertical tube, wherein said container has a feeding position and a filling position, said container raised to said top cover in said feeding position and said container lowered to said lower portion of said vertical tube in said filling position.

6. A portable game feeder apparatus for dispensing feed comprising:

a container for storing feed, said container including a bottom panel having a center opening therethrough and a feeder opening therein;

a vertical tube extending through said center opening, said vertical tube having an upper portion and a lower portion;

an inner sleeve attached to said bottom panel and aligned with said center opening, said inner sleeve slidably extending over said vertical tube; and means for raising and lowering said container, said raising and lowering means mounted to said vertical tube and connecting to said inner sleeve, wherein said container has a feeding position and a filling position, said container raised to said upper portion of said vertical tube in said feeding position and said container lowered to said lower portion of said vertical tube in said filling position.

7. The apparatus of claim 6, further comprising a plurality of legs connected to said lower portion of said vertical tube.

8. The apparatus of claim 7, wherein said plurality of legs are pivotably connected to said vertical tube for portability.

9. The apparatus of claim 6, wherein said vertical tube comprises first and second members, said first member including said upper portion and said second member including said lower portion.

10. The apparatus of claim 6, further comprising a top cover mounted to said upper portion of said vertical tube.

11. The apparatus of claim 10, wherein said top cover contacts said container when said container is in said feeding position.

12. The apparatus of claim 6, wherein said means for raising and lowering comprises:

a winch having a rotatable spool, said winch attached to said vertical tube; and a cable having a first end attached to said rotatable spool, said cable having a second end attached to said inner sleeve.

13. The apparatus of claim 12, wherein said means for raising and lowering further comprises:

a first pulley rotatably connected to said lower portion of said vertical tube; and a second pulley rotatably connected to said upper portion of said vertical tube, wherein said cable is guided by said first and second pulleys to said inner sleeve.

14. The apparatus of claim 13, wherein said cable extends from said first pulley to said second pulley within said vertical tube.

15. The apparatus of claim 6, wherein said container has an upper open end and said container is vertically oriented.

* * * * *